June 20, 1933. J. W. PETERSON 1,914,978
BRAKE
Filed Oct. 22, 1930

INVENTOR.
JOHN W. PETERSON
BY M. W. McConkey
ATTORNEY

Patented June 20, 1933

1,914,978

UNITED STATES PATENT OFFICE

JOHN W. PETERSON, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 22, 1930. Serial No. 490,470.

This invention relates to brakes and is illustrated as embodied in an internal expanding automobile brake of the shiftable-anchorage type. An object of the invention is to provide a simple anchorage for the brake which will permit a small amount of movement of the anchored end of the friction means radially of the brake drum to compensate for inaccuracies in manufacture and for eccentricities of the drum.

In one embodiment of the invention, the anchorage of the brake includes a rockably mounted member which is embraced between the ends of the friction means so that it can shift slightly to allow the desired movement of the anchored end of the friction means when the brake is applied. Preferably this member is sleeved on a fixed anchor post which is ordinarily carried by the backing plate and which takes the torque of the entire brake from one end or the other of the friction means acting through the rockably mounted thrust member.

Various features relate to the construction of the thrust member and to its manner of engagement with the brake shoes or their equivalents, and also to its arrangement with respect to the applying means of the brake and with respect to a positioning stop for the shoe end, and to other novel and desirable constructions which will be apparent from the following description of one illustrative embodiment shown in the accompanying drawing, in which.

Figure 1:
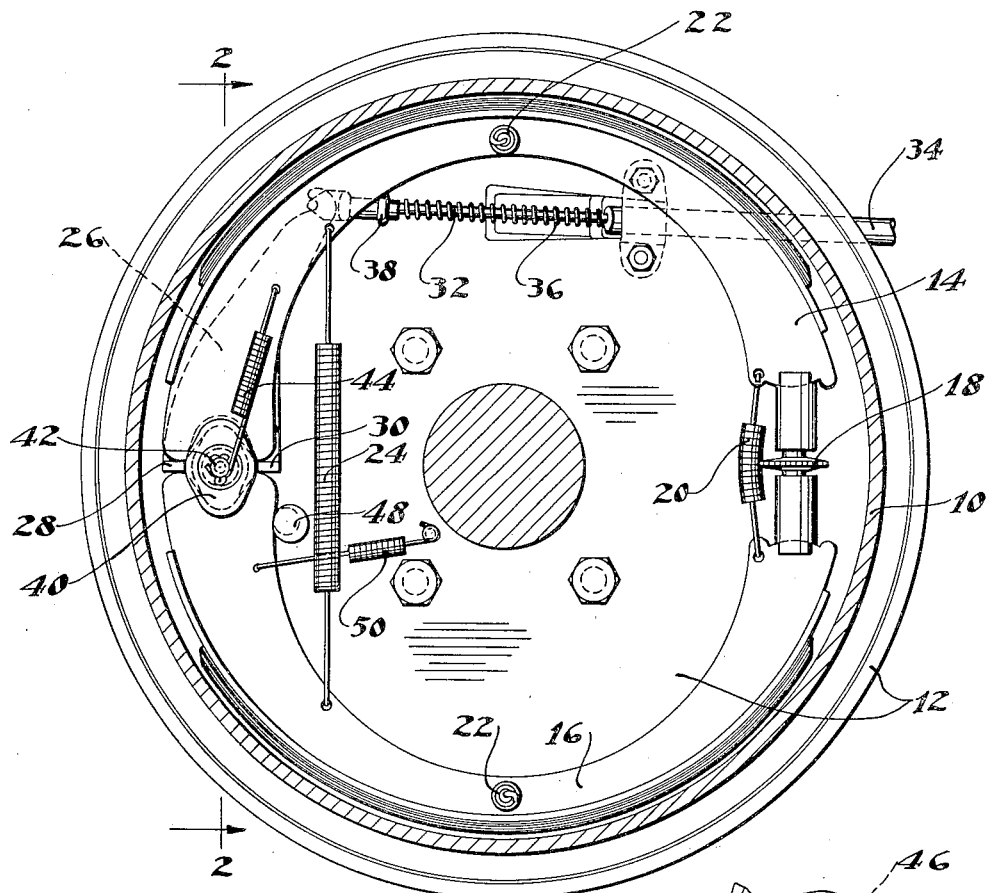
Figure 1 is a vertical section through the brake just inside the head of the brake drum and showing the brake shoes in side elevation.
Figures 2, 3:
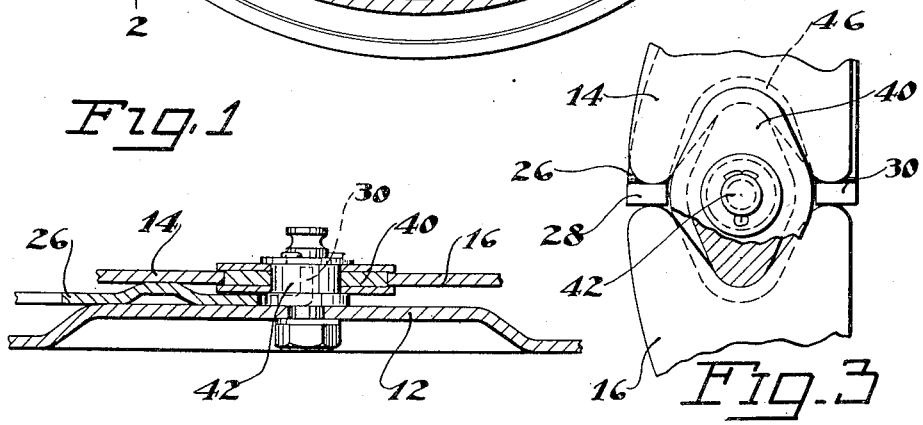
Figure 2 is a partial section on the line 2—2 of Figure 1 and showing the brake anchorage and part of the applying means.
Figure 3 is an elevation of the anchored ends of the shoes and the anchorage embraced between them, partly broken away and on a larger scale than Figure 1.

The brake selected for illustration includes a rotatable drum 10, at the open side of which is arranged a suitable support such as a backing plate 12, and within which is arranged the friction means of the brake. I prefer to utilize friction means including a pair of shoes 14 and 16 connected by means such as an adjustable pivot connection 18 against which the shoes are held by a spring 20 tensioned between them, and provided with suitable steady rests 22 of any desired form.

The brake is applied against the resistance of a return spring 24 by an applying device such as a floating lever 26 formed with lugs 28 and 30 extending between the ends of the brake shoes at the forward side of the backing plate and extending upwardly between the web of shoe 14 and the backing plate, and adjacent the upper part of the backing plate connected to a cable or other tension element 32 passing through the backing plate and through a flexible Bowden conduit 34 which extends to the chassis frame (not shown). A coil return spring 36 may be sleeved on the cable 32 and confined between the end of the conduit 34 and a fitting 38 on the end of the cable which hooks over the end of the applying lever 26.

According to an important feature of the invention, the anchorage of the brake includes a rockable elongated thrust member 40 having rounded ends seated in notches in the ends of the shoes 14 and 16 whereby the end of one of the shoes seats on the thrust member 40 when the drum is turning in one direction when the brake is applied and the other of said shoes anchors on the thrust member if the drum is turning in the other direction when the brake is applied, while both of the shoes engage the thrust member when the brake is released.

Preferably, the thrust member 40 is pivotally sleeved on a fixed anchor post 42 carried by the backing plate 12. An auxiliary return spring 44 may, if desired, be tensioned between the shoe 14 and the end of the anchor post 42. It should be noted that the notches in the ends of the shoes 14 and 16 are on a somewhat greater radius than the curves at the ends of the rockable thrust member 40 so that while the thrust member seats in the notches, there is no interference with a slightly pivotal or rocking motion when the brake is applied, sufficient to allow movement of the anchored end of the shoe 14 and 16 (as the case may be) to compensate for eccentricities of the drum and other inaccuracies. It should also be noted that the lugs 28 and 30 of the lever 26 are on opposite sides of the above-described anchorage and that the lever 26 is formed with a relatively large notch 46 affording ample clearance for the anchorage.

As a matter of economy in manufacture, I prefer to make the thrust member by spot-welding together three plates or laminations stamped from a steel sheet, the outer laminations being longer than the central one and arranged to embrace the ends of the shoes between them.

In order to make sure that a rocking motion of the member 40 when the brake is released will not cause any dragging of the brake, I prefer to mount on the backing plate a stop such as an adjustable eccentric 48 engaged by the inner edge of the web of shoe 16 and against which that shoe may be urged such as a spring 50 tensioned between the shoe and the backing plate. This spring is substantially radial, while the spring 44 is approximately tangential, so that when the brake is applied the cam end of shoe 16 engages the drum before the rest of the friction means, to predetermine the anchorage.

While one illustrative embodiment of the invention has been described in detail, it is not my intention to limit its scope to that particular embodiment or otherwise than by the terms of the appended claims.

I claim:

1. A brake of the shiftable-anchorage type comprising friction means having between its ends an anchorage including a fixed anchor post and an elongated thrust member sleeved on said post and embraced between said ends.

2. A brake comprising a drum and a friction device arranged to anchor at one end when the drum is turning in one direction and at the other end when the drum is turning in the other direction, in combination with an anchor post between said ends and a thrust device pivotally sleeved on said anchor post and pivotally engaged by one or the other of said ends when the brake is applied and by both of them when the brake is released.

3. A brake comprising a drum and a friction device anchoring at one end when the drum is turning in one direction and at the other end when the drum is turning in the other direction, in combination with an anchorage for the friction device including a rockable member engaged by and between said ends.

4. A brake comprising a drum and a friction device anchoring at one end when the drum is turning in one direction and at the other end when the drum is turning in the other direction, in combination with an anchorage for the friction device including a rockable member engaged by and between said ends, together with an applying device also engaging said ends and operable to pry them apart.

5. A brake comprising friction means having adjacent separable ends, a fixed post between said ends, a thrust part rockably sleeved on said post and embraced between said ends and an applying device having engagement with said ends on opposite sides of said thrust part.

6. A brake comprising friction means having adjacent separable ends, a fixed post between said ends, and a thrust part rockably sleeved on said post and embraced between said ends.

7. A brake comprising friction means having separable ends, a rockably mounted anchoring part embraced between said ends, and an applying device having lugs extending between said ends on opposite sides of the anchoring part.

8. A brake comprising friction means having separable ends formed with rounded notches facing toward each other, in combination with a rockably mounted anchoring part between said ends having rounded portions seated in said notches, a stop engageable by the inner edge of the friction means adjacent one of said ends when the brake is released, and a spring urging said end of the friction means against the stop.

9. A brake comprising a backing plate having friction means mounted thereon and arranged with separable ends at one side of the plate, a rockably mounted anchor embraced between said ends, an applying device extending upwardly from said ends to the top of the plate, and a tension element extending through the upper part of the plate and connected to the applying device.

10. A brake anchorage comprising a fixed anchor post having a thrust member rockably mounted thereon, in combination with an applying lever having operating parts on opposite sides of the thrust member and formed with a relatively large opening affording clearance for the anchor post and the thrust member.

11. A brake comprising a rockably mounted anchoring part having rounded ends, in combination with friction means having notches rounded on a greater radius than the ends of said part and between which said part is embraced.

12. A brake comprising a rockably mounted anchoring part having a rounded end, in combination with friction means having a notch rounded on a greater radius than the end of said part and pivotally engaging said part to transmit the braking torque thereto.

In testimony whereof, I have hereunto signed my name.

JOHN W. PETERSON.